Oct. 9, 1962 J. T. GONDEK 3,057,374
RELIEF VALVE ASSEMBLY
Filed Jan. 23, 1961

INVENTOR
John T. Gondek
BY Robert M. Dunning
ATTORNEY

United States Patent Office 3,057,374
Patented Oct. 9, 1962

3,057,374
RELIEF VALVE ASSEMBLY
John T. Gondek, 2206 Roosevelt St. NE.,
Minneapolis, Minn.
Filed Jan. 23, 1961, Ser. No. 84,136
8 Claims. (Cl. 137—538)

This invention relates to an improvement in relief valve assembly and deals particularly with a relief valve which permits a metered flow of hydraulic fluid from a pressure chamber when abnormal pressures are experienced in this chamber.

An object of the present invention resides in the provision of a relief valve which, in preferred form, includes a plunger having a peripheral flange which is designed to substantially seal with respect to the body of the valve. Movement of the plunger is resisted by an adjustable spring. The plunger includes an axial socket in one end which is in communication with the pressure chamber. The plunger is slidable in a bushing which terminates short of an inwardly projecting flange of the body. A ring encircles the plunger between the end of the bushing and the inwardly projecting body flange. A sealing ring encircles the first named ring. The rings are spaced from the end of the bushing a distance sufficient to permit oil under pressure to enter the ring chamber as the plunger moves against the tension of the spring. This fluid pressure in the ring chamber acts to urge the inner ring inwardly against the plunger, the fluid from the pressure chamber being communicated through openings in the walls of the plunger forming the socket. Thus the pressure within the pressure chamber does not escape until openings in the walls of the plunger pass the inwardly extending flange on the body, the structure then permitting a metered flow from the interior of the socket to the interior of the spring chamber from which the fluid may escape.

A feature of the preferred form of construction lies in the fact that the body of the valve may be made of aluminum or other metal which is highly conductive of heat so that the heat generated by the restricted flow of hydraulic fluid may be dissipated. As a result, the bushing and the ring may, if desired, be formed of Teflon or similar material. When the ring encircling the plunger is made of Teflon, no leakage may occur from the plunger until after the openings of the wall of the plunger have passed the inwardly extending flange. Further movement of the plunger then permits the fluid under pressure to escape.

These and other objects and novel features of the invention will be more clearly and fully, set forth in the following specification and claims.

In the drawings forming a part of the specification,

Figure 1:
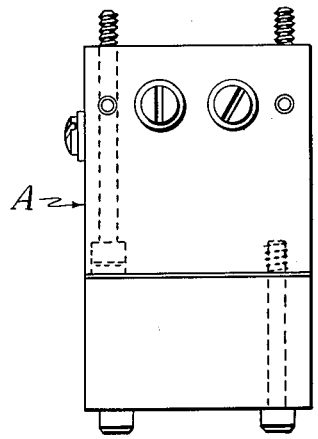
FIGURE 1 is an elevational view of a hydraulic unit in which a pair of relief valves are incorporated.
Figure 3:
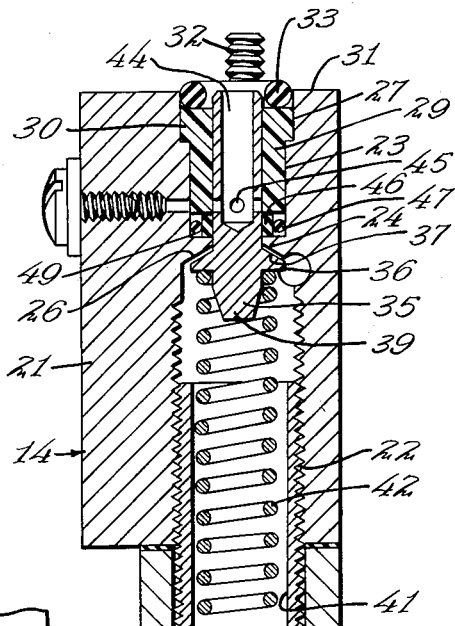
FIGURE 3 is a transverse sectional view through one of the relief valves, the position of the section being indicated by the line 3—3 of FIGURE 2.
Figure 2:
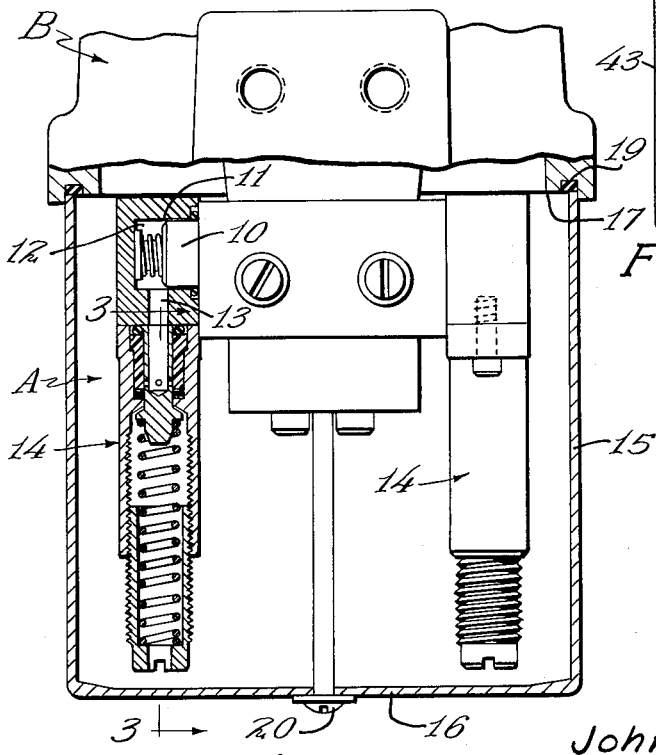
FIGURE 2 is a sectional view, portions of which have been broken away to disclose the position of one of the two relief valves.
Figure 4:
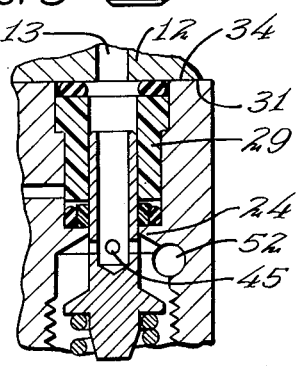
FIGURE 4 is a detailed sectional view of a portion of the relief valve illustrated in FIGURE 3, showing a different position of the valve plunger.

The relief valve assembly A which is illustrated in the drawings may be used in various ways, and in the particular arrangement illustrated, the assembly A is shown as being connected to a pump B, the output of which is controlled by a valve 10 which is reciprocable in a cylinder 11. Pressure chambers such as 12 are provided at each end of the valve 10, it being possible for either of these valve chambers to be subjected to abnormal pressures.

A passage 13 leads from each valve chamber 12 to a relief valve 14 which is the subject of the present invention. In view of the fact that the relief valves 14 are of identical form, only one valve is illustrated in detail.

An enclosure 15 having a closed lower end 16 and an upper open end 17 has this upper open end sealed against a gasket 19 at the lower end of the pump B. The enclosure 15 is held in place by clamping bolts 20 so that the enclosure may serve as a reservoir for the pump if desired.

As indicated in FIGURE 1 of the drawings, the relief valve 14 includes a block shaped body 21 which is preferably formed of aluminum or some other material of high heat conductivity. The body 21 includes an internally threaded socket 22 in one surface which communicates with a cylindrical socket 23 in the opposite surface thereof. An inwardly extending flange 24 is interposed between the threaded socket 22 and the aligned socket 23, the flange 24 preferably having a tapered wall 26 at the end of the threaded socket 22. The cylindrical socket 23 is provided with an enlarged diameter end portion 27. A bushing 29 fits snugly within the cylindrical socket 23 and is provided with an enlarged end portion 30 which fits within the socket portion 27. The lower edge of the enlarged diameter portion 30 of the bushing forms a shoulder which limits the insertion of the bushing into the socket. The end of the bushing preferably terminates short of the surface 31 of the valve body into which the socket 23 extends. The surface 31 of the body is designed to be secured in flush relation to the body of the cylinder 12 through the use of bolts 32 or other suitable attaching means. A sealing ring 33 is interposed between the end of the bushing 29 and the surface 34 of the cylinder 12 to which the valve body is attached.

A valve plunger 35 is slidably supported within the bushing 29. The plunger 35 includes a peripheral flange 36 which has a tapered upper surface 37 which is normally spaced slightly from the tapered surface 26 of the valve body. A spring centering lug 39 is provided on the end of the plunger 35. A spring adjusting cap 40 is threaded into the internally threaded socket 22 and is provided with a spring cavity 41 designed to accommodate the pressure relief spring 42. The spring 42 is interposed between the peripheral flange 36 and the apertured head 43 of the cap 40. The lower end of the pressure chamber 12 limits upward movement of the plunger 35.

The plunger 35 extends upwardly through the bushing 29 and is provided with an internal socket 44, the interior of which is in communication with a fluid pressure chamber, such as the pressure chamber 12 previously described. The wall of the socket 44 is provided near the closed end of the socket with angularly spaced apertures 45 which are normally closed by the inner surface of the bushing 29.

An inner sealing ring 46 is interposed between the end of the bushing 29 and the inwardly extending flange 24 on the valve body 21. A resilient outer sealing ring 47 encircles the inner sealing ring 46. The inner sealing ring 46 is slightly shorter in axial length than the space between the end of the bushing 23 and the flange 24. As a result, any downward movement of the valve plunger 35 causes fluid under pressure to flow through the openings 45 and to enter the sealing chamber 49 in which the sealing rings are located. This pressure tends to urge the inner sealing ring against the plunger and also to expand the outer sealing ring 47.

In the drawings, the plunger flange 36 is shown in slightly spaced relation to the body flange 24 and is limited to this upper position by the engagement of the upper end of the plunger 35 with the lower end of the chamber 12. When abnormal pressures are experienced in the pressure chamber such as 12, they are directed through a communicating passage such as 13 to the interior of the socket 44. The plunger 35 is then forced against the spring 42 to compress the spring.

The downward movement of the plunger 35 brings the openings 45 into communication with the seal chamber 49 which urges the inner sealing ring 46 against the plunger, and forms a seal between the plunger and the valve body. Accordingly, the fluid under pressure cannot escape until the openings 45 have passed below the sealing rings, and a certain amount of fluid is metered between the inner wall of the flange 24 and the body of the plunger. Thus the abnormal pressure is lowered in a comparatively gradual manner unless this abnormal pressure is sufficiently high to move the plunger to such an extent that the openings 45 pass the inner periphery of the flange 24. This metered escape of fluid materially increases the temperature of the fluid, and the body 14 of the valve is purposely made of a material having high heat transfer properties, so as to permit the dissipation of the heat generated.

In preferred form, the bushing 29 is made of a plastic material such as Teflon, although other materials could be used if closer tolerances are required. When the sealing ring 46 is made from Teflon, there is no leakage past the seal, while if aluminum or some other metal is used, a certain amount of leakage will take place. The body of the valve is purposely constructed to prevent the burning of the Teflon as heat is accumulated in the body by the metering of fluid from the valve.

The interior of the spring chamber is provided with a suitable outlet, such as the passage 52 which may communicate with the reservoir or to any desired area of reduced pressure. While the bushing and inner sealing ring are described as being produced of Teflon, this material may be of a material having properties similar to those of Teflon, or any Teflon-like material. The outer sealing ring may be of neoprene, rubber, or a similar elastic or resilient material. The inner ring may also be made of metal if it is preferred.

In accordance with the patent statutes, I have described the principles of construction and operation of my improvement in relief valve assembly, and while I have endeavored to set forth the best embodiment thereof, I desire to have it understood that changes may be made within the scope of the following claims without departing from the spirit of my invention.

I claim:

1. A pressure relief valve comprising a valve body having axially aligned sockets in opposite sides thereof, an inwardly extending body flange on said body between said sockets defining a passage between said sockets, a bushing in one of said sockets terminating in spaced relation said flange to define a seal chamber, a plunger slidably supported by said bushing and extending through said passage, said plunger including a peripheral flange adjacent one end thereof located within the body socket opposite said seal chamber, resilient means urging said flanges together, said plunger having an axial socket communicating with the other plunger end, the portions of the plunger encircling said socket defining socket walls having a passage therethrough normally closed by said bushing, an inner sealing ring in said seal chamber encircling said plunger, and an outer sealing ring encircling said inner sealing ring, whereby when said plunger socket is subjected to fluid pressure movement of said plunger in a direction to separate said flanges causes communication between the interior of the plunger socket and said seal chamber, urging said inner sealing ring against said plunger and holding said plunger passage sealed until said passage moves past said seal chamber.

2. The structure of claim 1 and in which said body flange fits closely about said plunger to meter the flow of fluid therebetween.

3. The structure of claim 1 and in which the inner sealing ring is formed of Teflon-like material.

4. The structure of claim 1 and in which the bushing is formed of Teflon-like material.

5. The structure of claim 1 and in which the inner sealing ring and bushing are formed of Teflon-like material.

6. The structure of claim 1 and in which the valve body is formed of material of high heat conductivity.

7. The structure of claim 1 and in which the inner sealing ring and bushing are made of metal.

8. A pressure relief valve comprising a valve body having axially aligned sockets in opposite sides thereof, an inwardly extending body flange on said body between said sockets defining a passage between said sockets, a bushing in one of said sockets terminating in spaced relation to said flange to define a seal chamber, a plunger slidably supported by said bushing and extending through said passage, said plunger including a peripheral flange adjacent one end thereof engageable against the end of said body flange opposite said seal chamber, a socketed cap adjustably supported for longitudinal movement in the other of said sockets, a spring interposed between said flange on said plunger and said cap to urge said flanges together, said plunger having an axial socket communicating with the other end of said plunger, said plunger having a radial passage therethrough connecting a point near the base of said plunger socket but upstream of said seal chamber with the exterior thereof, said radial passage being normally closed by said bushing, an inner sealing ring in said seal chamber encircling said plunger, and an outer sealing ring encircling said inner sealing ring, whereby when said plunger socket is subjected to fluid pressure, movement of said plunger in a direction to separate said flanges causes communication between the interior of the plunger socket and said seal chamber, urging said inner sealing ring against said plunger and holding said radial passage sealed until said passage moves past said seal chamber.

References Cited in the file of this patent

UNITED STATES PATENTS

| | | |
|---|---|---|
| 1,935,899 | Yarnall | Nov. 21, 1933 |
| 2,287,840 | Stratton | June 30, 1942 |
| 2,938,704 | Quail | May 31, 1960 |

FOREIGN PATENTS

| | | |
|---|---|---|
| 489,834 | France | Nov. 5, 1918 |